United States Patent [19]
Nakamura et al.

[11] Patent Number: 5,178,242
[45] Date of Patent: Jan. 12, 1993

[54] HYDRAULIC DAMPER

[75] Inventors: Michiya Nakamura; Kimihisa Kasajima, both of Kanagawa, Japan

[73] Assignee: Atsugi Unisia Corporation, Japan

[21] Appl. No.: 792,589

[22] Filed: Nov. 15, 1991

[30] Foreign Application Priority Data

Nov. 19, 1990 [JP] Japan .............................. 2-121394[U]
Jan. 9, 1991 [JP] Japan .................................. 3-222[U]

[51] Int. Cl.⁵ ............................................. F16F 9/34
[52] U.S. Cl. .................................................. 188/319
[58] Field of Search ............... 188/279, 280, 282, 285, 188/299, 322.15, 319; 280/707

[56] References Cited

U.S. PATENT DOCUMENTS

| | | | |
|---|---|---|---|
| 4,615,420 | 10/1986 | Mourray | 188/222 |
| 4,660,689 | 4/1987 | Hayashi et al. | 188/319 |
| 4,953,671 | 9/1990 | Imaizumi | 188/285 |
| 5,016,908 | 5/1991 | Athanas et al. | 280/707 |

FOREIGN PATENT DOCUMENTS

| | | | |
|---|---|---|---|
| 60-2035 | 9/1985 | Japan . | |
| 275128 | 11/1990 | Japan | 188/319 |
| 2159917 | 12/1985 | United Kingdom . | |
| 2199920 | 7/1988 | United Kingdom . | |

Primary Examiner—Robert J. Oberleitner
Assistant Examiner—Kevin D. Rutherford
Attorney, Agent, or Firm—Ronald P. Kananen

[57] ABSTRACT

A hydraulic damper comprises a reciprocal piston in a cylinder containing a hydraulic fluid, a piston rod including a reduced diameter valve sleeve fixedly received in a through bore of the piston, and a valve element disposed in the valve sleeve for relative movement to the valve sleeve between a plurality of positions. The relative position of the valve element to the valve sleeve is adjustable via a control rod from the outside, such as by an actuator. The valve sleeve has an inlet port communicating with a first chamber on one side of the piston and an outlet port. The valve element has a transfer groove. The valve element covers the inlet port and is moveable to uncover the inlet port to allow fluid communication between the inlet port and the transfer groove that in turn communicates with the outlet port. A first increased damping force generating valve and a second decreased damping force generating valve are mounted to the piston. The second decreased damping force generating valve means prevents fluid flow into the outlet port from a second chamber on the opposite side of the piston and restricts hydraulic fluid flow out of the outlet port into the second chamber.

12 Claims, 6 Drawing Sheets

HYDRAULIC DAMPER

BACKGROUND OF THE INVENTION

The present invention relates to a hydrauliuc damper for a vehicular suspension system.

Japanese Utility Model Application First (unexamined) Publication No. 60-2035 discloses a hydraulic damper. This known hydraulic damper comprises a cylinder containing a hydraulic fluid, a piston within the cylinder and mounted on a piston rod. The piston has one or more rebound valve passages having one ends communicating with a first chamber adjacent to an upper face of the piston and opposite ends opening at an annular groove contained in a lower face of the piston. The piston has one or more compression valve passages having one ends opening to a second chamber adjacent to the lower face of the piston and opposite ends opening at an annular groove contained in the upper face of the piston. A valve disc is mounted on the upper face to bridge a peripheral annular groove created by the adjacent annular groove. Another valve disc is mounted on the lower face of the piston to bridge a peripheral annular groove created by the adjacent annular groove. The piston rod includes a valve sleeve formed with a plurality of ports communicating with the first chamber. Rotatably disposed in the valve sleeve is a valve element having a passage having one end closed and an opposite end communicating with the first chamber. The valve element has openings mating with the plurality of ports. The mating ports and openings cooperate with each other to variably restrict bypass flow of hydraulic fluid between the first and second chambers.

U.S. Pat. No. 4,615,420 discloses a hydraulic damper. This known hydraulic damper includes a first set of one or more passages controlled by two valve mechanisms, which conduct fluid only during rebound stroke. A second set of passages, controlled by a single valve mechanism, conducts fluid during all compression and rebound strokes. A third set of passages uncontrolled by any valve mechanism conducts fluid during all compression and rebound strokes.

An object of the present invention is to provide a hydraulic damper of the type including a valve element within a valve sleeve wherein a sufficiently wide range of damping force vs. piston stroke characteristics is provided.

SUMMARY OF THE INVENTION

According to the present invention, there is provided a hydraulic damper comprising:

means for defining a bore containing a hydraulic fluid;

means for dividing said bore into a first chamber and a second chamber, said dividing means including a piston having a through bore and wall means defining said through bore, a piston rod including a reduced diameter valve sleeve fixedly received in said through bore, a valve element disposed in said valve sleeve for relative movement to said valve sleeve between a plurality of positions, said valve sleeve having at least one first port communicating with said first chamber, said valve element having a passage having one end closed and an opposite end communicating with said second chamber and wall means defining said passage, said valve element having an opening communicating with said passage, said valve element covering said first port and being movable to uncover said first port to allow fluid communication between said first port and said opening, said piston having a valve passage having one end communicating with said first chamber and an opposite end;

means for preventing fluid flow into said opposite end of said valve passage and restricting fluid flow from said opposite end of said valve passage into said second chamber;

said valve sleeve having at least one second port communicating with said first chamber and at least one third port, said valve element having a transfer groove, said valve element covering said second port and being moveable to uncover said second port to establish fluid communication between said second port and said transfer groove that in turn communicates with said third port; and means for preventing fluid flow into said third port from said second chamber and restricting fluid flow out of said third port into said second chamber.

DETAILED DESCRIPTION OF THE INVENTION

Figure 1:
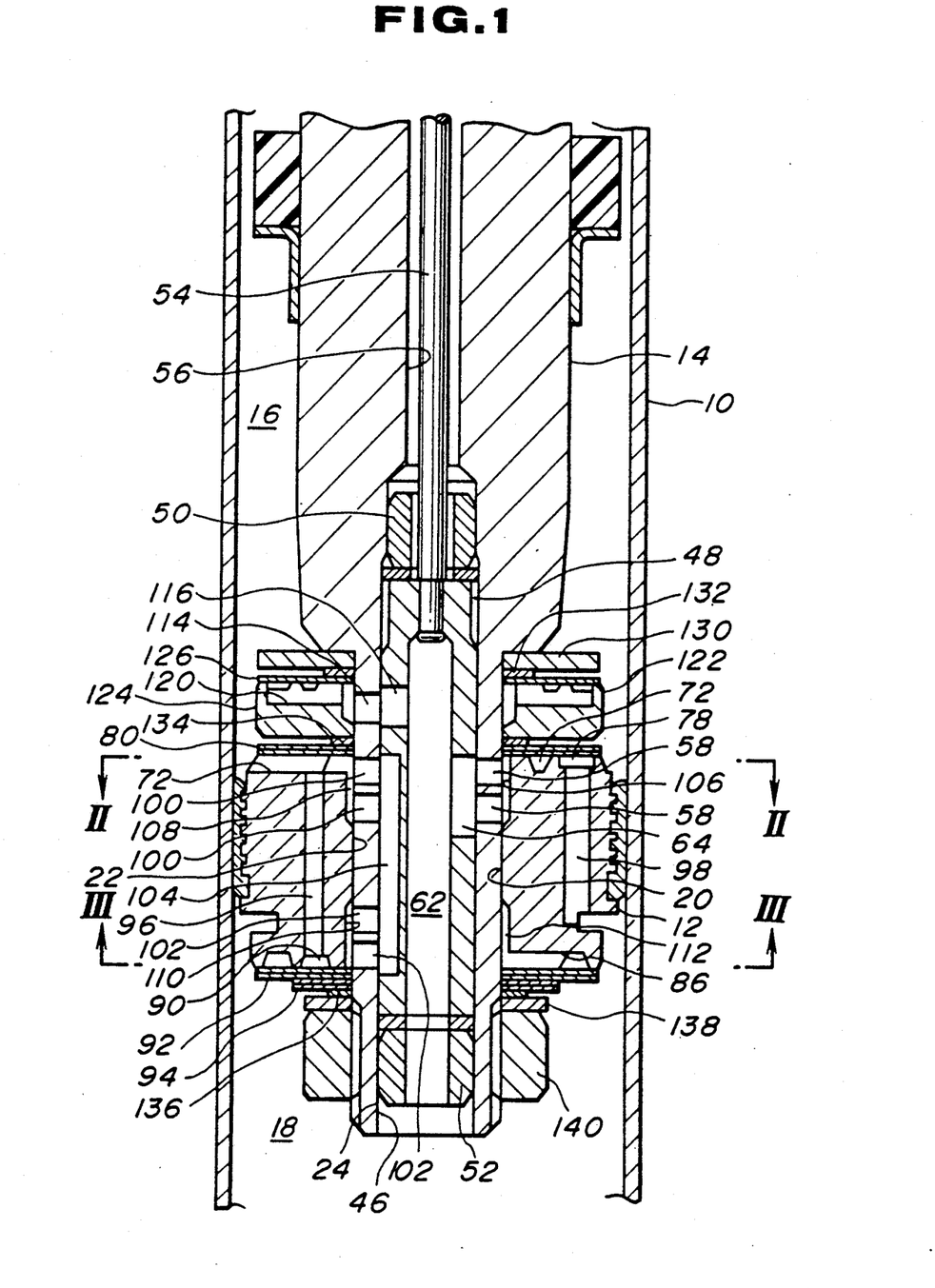
FIG. 1 is a fragmentary section of a first embodiment of a hydraulic damper taken through the lines I—I in FIGS. 2 and 3.
Figure 2:
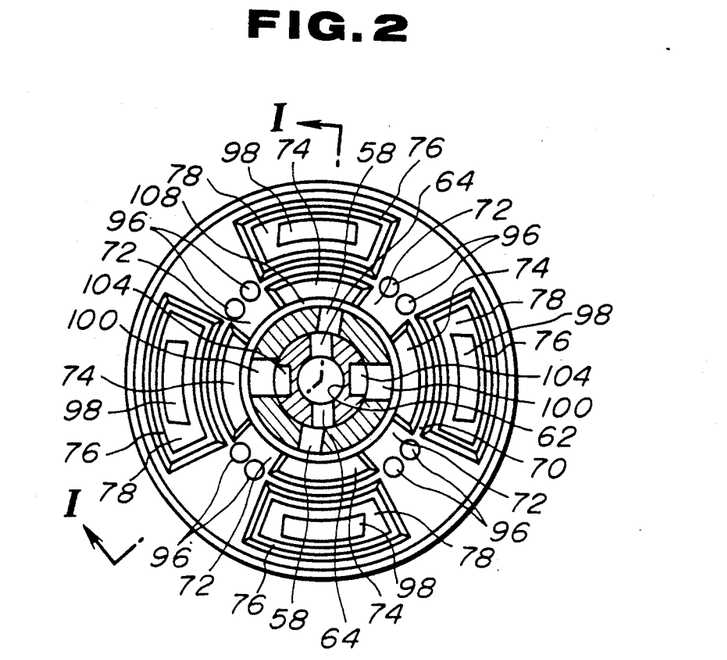
FIG. 2 is a section through the line II—II in FIG. 1.
Figure 3:
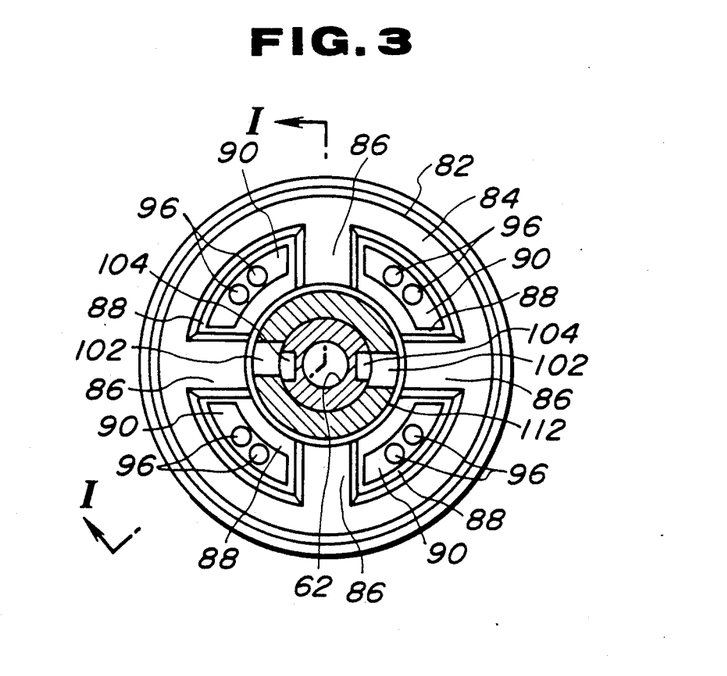
FIG. 3 is a section taken through the line III—III in FIG. 1.

Referring to FIGS. 1, 2 and 3, there is shown a first embodiment of a hydraulic damper according to the present invention. It is to be noted that FIG. 1 is a sectional view taken through the lines I—I of FIGS. 2 and 3.

FIG. 1 shows a fragmentary section of the hydraulic damper. The hydraulic damper comprises a cylinder 10 defining a bore containing a hydraulic fluid. Reciprocally disposed in the cylinder 10 is a piston assembly including a generally cylindrical piston 12 mounted on a piston rod 14. The piston assembly divides the bore into a first chamber 16 on one side of the piston 12 and a second chamber 18 on the opposite side of the piston 12. The first and second chambers 16 and 18 are filled with hydraulic fluid.

The piston 12 has a central through axial bore 20 and wall 22 defining the through axial bore 20. The piston rod 14 includes a reduced diameter valve sleeve 24 fixedly received in the through axial bore 20.

The reduced diameter valve sleeve 24 is formed with a bore 46. Disposed in the bore 46 of the valve sleeve 24 is an adjustor or a valve element 48. The valve element 48 is interposed between two bushings 50 and 52. Owing to these bushings 50 and 52, the valve element 48 is rotatably moveable relative to the valve sleeve 24. Movement of the valve element 48 is effected by a control rod 54. The control rod 54 extends through a reduced diameter bore 56 and has one end connected to the valve element 48 and an opposite end operatively connected to an actuator, not shown, disposed outside of the cylinder 10.

The valve sleeve 24 has one or more first valve ports 58. The ports 58 are radial ports and axially aligned in a spaced relationship. It will be understood as the description proceeds that the ports 58 are always in communication with the first chamber 16. The valve element 48 has an axial passage 62 having one end closed and an opposite end communicating with the second chamber 18 via an opening of the bushing 52. The valve element 48 has one or more radial openings 64 communicating with the axial passage 62. It is to be noted that the flow rate through the axial passage 62 during compression and rebound strokes is governed by restriction generated by the overlapping relationship between the valve ports 58 and the mating one of the radial openings 64. This relationship is variable by adjusting an angular position of the valve element 48 relative to the valve sleeve 46.

As best seen in FIG. 2, an upper face of the piston 12 is formed with an annular groove 70 and one or more radial grooves 72. As a result, one or more radially inboard lands 74 and one or more radially outboard lands 76 are created on the upper face of the piston 12. Each of the inboard lands 74 is defined by the inner periphery of the upper face of the piston 12, the annular groove 70, and the adjacent two radial grooves 72. Each of the outboard lands 76 is defined by the annular groove 70 and the adjacent two radial grooves 72. Each of the outboard lands 76 is formed with a groove 78.

An annular valve disc stack 80 is mounted in superposition on the upper face of the piston 12. The discs stack 80 is flat and of a sufficient diameter to bridge the inboard and outboard lands 74 and 76.

As best seen in FIG. 3, a peripheral annular land 82 is created on a lower face of the piston 12 by a peripheral annular groove 84. Also contained in the lower face of the piston 12 are one or more radial grooves 86. As a result, one or more lands 88 are created on the lower face of the piston 12 within the peripheral annular land 82. Each of the lands 88 is defined by the inner periphery of the upper face of the piston 12, the annular groove 84, and the adjacent two radial grooves 86. Each of the lands 88 is formed with a groove 90.

Two annular valve disc stacks 92 and 94 are mounted in superposition on the lower face of the piston 12. The disc stack 92 is flat and of a sufficient diameter to bridge the lands 88 and the annular land 82. The disc stack 94 is flat and lying on the disc stack 92 and of a sufficient diameter to hold the disc stack 92 firmly in contact with the lands 88.

The piston has one or more valve passages 96, each having one end opening at one of the radial grooves 72 contained in the upper face of the piston 12 and an opposite end opening at one of the grooves 90 formed in the lands 88 contained in the lower face of the piston 12.

The valve passages 96 allow fluid flow therethrough during rebound stroke. The piston 12 also has one or more valve passages 98, each having one end opening at one of the grooves 78 of the outboard land 76 contained in the upper face of the piston 12 and an opposite end opening to the second chamber 18. These valve passages 98 allow fluid flow therethrough during compression stroke.

The flow rate through the valve passages 98 is governed by the valve disc stack 80 during compression stroke, while the flow rate through the valve passages 96 is governed by the valve disc stacks 92 and 94 during rebound stroke. In other words, the valve disc stacks 92 and 94 prevent fluid flow into the opposite end of each of the valve passage 96 from the second chamber 18 and restrict fluid flow from the opposite end of each of the valve passage 96 into the second chamber 18.

The valve sleeve 46 has one or more inlet valve ports 100 communicating with the first chamber 16, and one or more outlet valve ports 102 communicating with the annular groove 84 contained in the lower face of the piston 12. The valve element 48 has one or more transfer grooves 104. The valve element 48 covers the inlet valve ports 100 and is moveable in a rotational direction to uncover the inlet valve ports 100 to establish fluid communication between the inlet valve ports 100 and the mating one of the transfer grooves 104. In this position, the transfer groove 104 communicates with the mating outlet valve ports 102. During rebound stroke, the flow rate through the outlet valve ports 102 is governed by the disc stack 92 in contact with the peripheral annular land 82 contained in the lower face of the piston 12. In other words, the valve disc stack 92 prevents fluid flow into the valve outlet ports 102 from the second chamber 18 and restricts fluid flow out of the outlet ports 102 into the second chamber 18. It is to be noted that the flow rate through the transfer grooves 104 is governed by restriction generated by the overlapping relation between the inlet valve ports 100 and the mating transfer groove 104 and by the overlapping relationship between the outlet valve ports 102 and the mating transfer groove 104. These overlapping relationships are variable by adjusting an angular position of the valve element 48 relative to the valve sleeve 46.

In order to assure sufficient supply of fluid to the valve ports 58 and 100 of the valve sleeve 48, the wall 22 defining the through axial bore 20 of the piston 12 includes an upper portion 106 surrounding the valve sleeve 24 in spaced relationship therefrom. Defined is an annular space 108 which communicates with the valve ports 58 and 100. As best seen in FIG. 2, hydraulic fluid flows inwardly through the radial grooves 72 into the annular space 108 to flow into the ports 58 and 100. In order to provide unrestricted flow of fluid out of the outlet ports 102 to the annular groove 84 contained in the lower face of the piston 12, the wall 22 includes a lower portion 110 surrounding the valve sleeve 24 in spaced relationship therefrom to define therebetween an annular space 112 which communicates with the outlet valve ports 102. As best seen in FIG. 3, hydraulic fluid from the outlet valve ports 102 flows via the annular space 112 and the radial grooves 86 into the annular groove 84.

The valve sleeve 24 has one or more compression valve ports 114 in mating relationship with radial openings 116 of the valve element 48. The radial openings 116 communicate with the axial passage 62. The compression valve ports 114 are in fluid communication with valve grooves 120 surrounded by an annular land 122 created in an upper face of an annular valve body 124. An annular valve disc 126 is mounted in superposition on the upper face of the valve body 124 and of a sufficient diameter to contact with the annular land 122. The valve disc 126 serves as an one-way check valve allowing fluid flow from the compression valve ports 114 toward the first chamber 16 only. It is to be noted that the flow rate through the axial passage 62 during compression stroke is governed by restriction generated by the overlapping relationship between the compression valve ports 114 and the mating radial openings 116. The relationship is variable by adjusting an angular position of the valve element 48 relative to the valve sleeve 46.

In assembly, an upper retainer 130, an upper washer 132, the valve disc 126, the valve body 124, a middle washer 134, the valve disc stack 80, the piston 12, the valve disc stacks 92 and 94, a lower washer 136, and a lower retainer 138 are mounted around the valve sleeve 46 and held by a nut 140.

Specifically, the compression ports 114, the inlet valve ports 100 and the outlet valve ports 102 are axially aligned. The valve ports 58 are angularly displaced from the inlet valve ports 100, respectively, as best seen in FIG. 2.

The hydraulic damper is operable in three different operating ranges, namely a hard position, a soft position and a medium position. These positions are described in detail below.

Figure 4A:
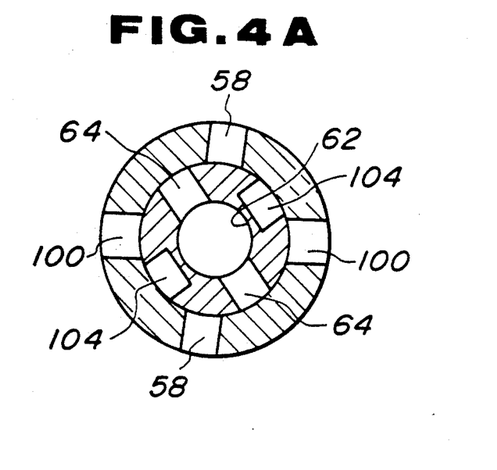
FIGS. 4A and 4B are fragmentary views of FIGS. 2 and 3, respectively, showing one angular position of a valve element relative to a valve sleeve.
Figure 4B:
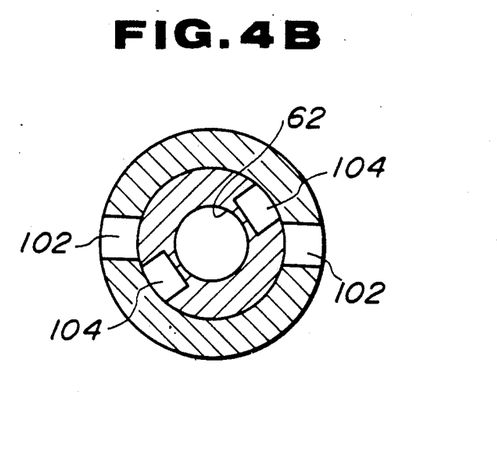
Figure 7:
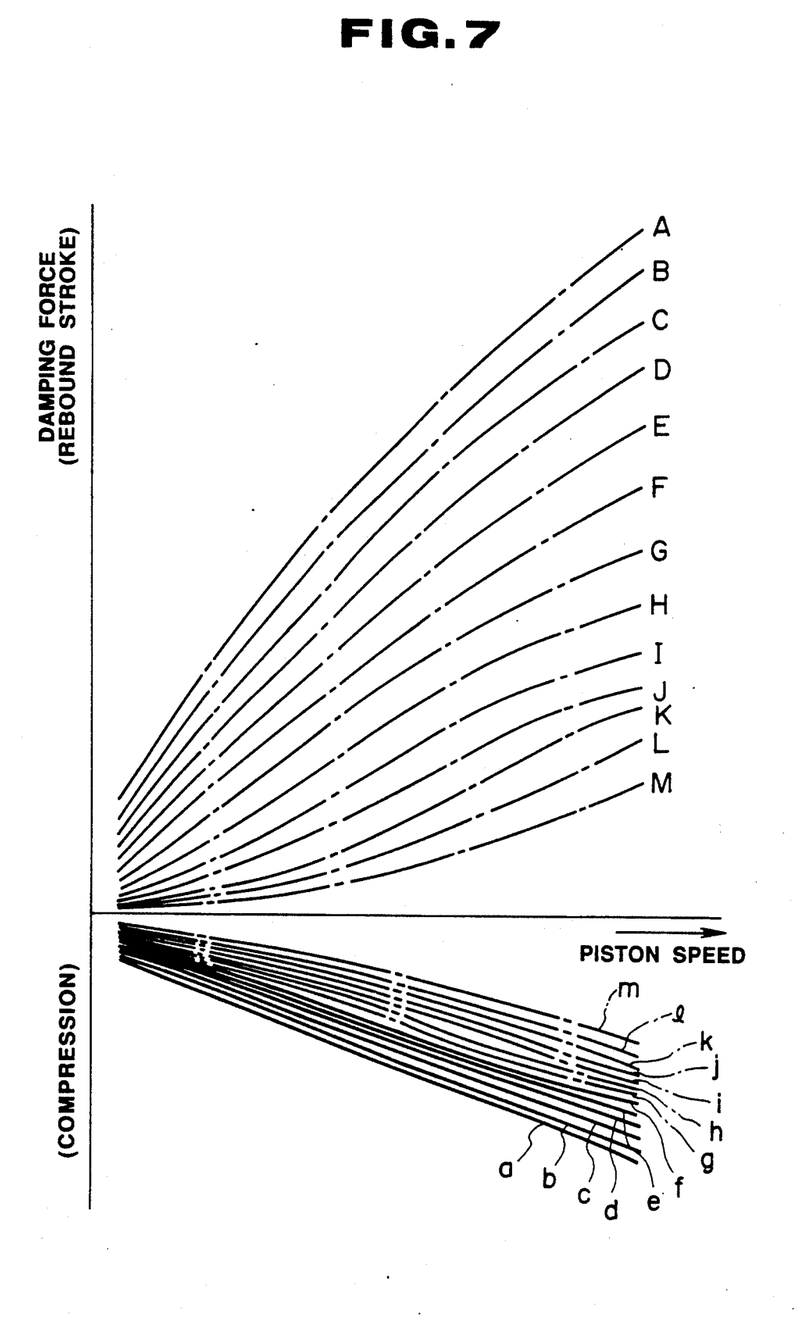
FIG. 7 is a graph showing damping force vs. piston speed characteristic curves.

FIGS. 4A and 4B show a position of parts when the hard position is selected. In this hard position, the valve ports 58 and the mating openings 64 are out of alignment and the inlet valve ports 100 and the mating transfer grooves 104 are out of alignment as shown in FIG. 4A, while the outlet valve ports 102 and the mating transfer grooves 104 are out of alignment as shown in FIG. 4B. Thus, hydraulic fluid flows through the valve passages 96 during rebound stroke, while hydraulic fluid flows through the valve passages 98 and flows through the axial passage 62 during compression stroke. Curves A and a in FIG. 7 show damping force vs piston speed characteristics during rebound and compression strokes, respectively.

Figure 5A:
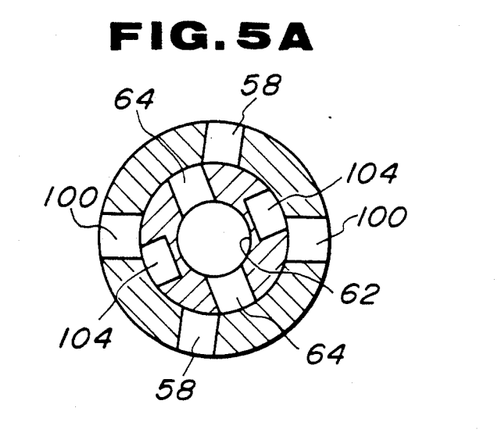
FIGS. 5A and 5B and are views showing another angular position.
Figure 5B:
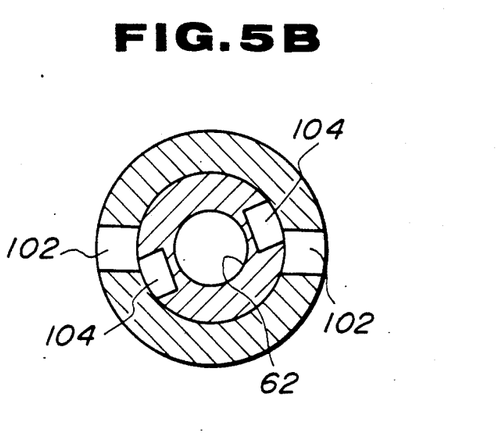

During clockwise rotation of the valve element 48 from the angular position shown in FIG. 4A to an angular position shown in FIG. 5A, there is no hydraulic fluid flow through the axial passage during rebound stroke since the inlet valve ports 100 and the openings 64 are left out of alignment. During this rotation, the overlap between the inlet valve ports 100 and the mating transfer grooves 104 and the overlap between the outlet valve ports 102 and mating transfer grooves 104 gradually increases. As a result, hydraulic fluid flows through the transfer grooves 104 during rebound stroke. The flow rate is adjustable by adjusting an angular position of the valve element 48. This range between the angular positions shown in FIG. 4A and 5A is called a medium range or position. Curves B, C, D, E and F in FIG. 7 show damping force vs. piston speed characteristics during rebound stroke, while curves b, c, d, e and f damping force vs. piston speed characteristics during compression stroke.

Figure 6A:
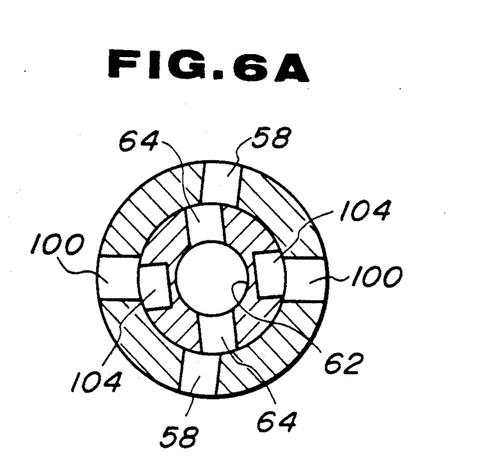
FIGS. 6A and 6B are views showing still another angular position.
Figure 6B:
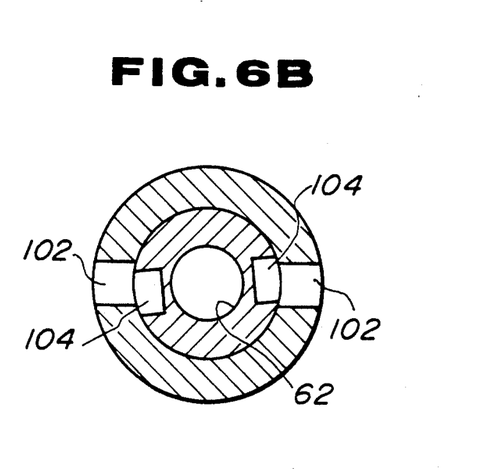

Further clockwise rotation beyond the angular position shown in FIG. 5A to an angular position shown in FIG. 6A causes the overlap to occur between the valve ports 58 and the openings 64. Thus, there occurs a hydraulic fluid flow through the axial passage 62 during rebound and compression strokes at an increased rate. As the rotation progresses, the degree of overlap between the valve ports 58 and the openings 64 increases. This range between the angular positions shown in FIGS. 5A and 6A is called as a soft range or position. In FIG. 7, curves H, I, J, K, L and M show damping force vs. piston speed characteristics during rebound stroke, while curves h, i, j, k, l and m damping force vs. piston speed characteristic during compression stroke.

Figure 8:
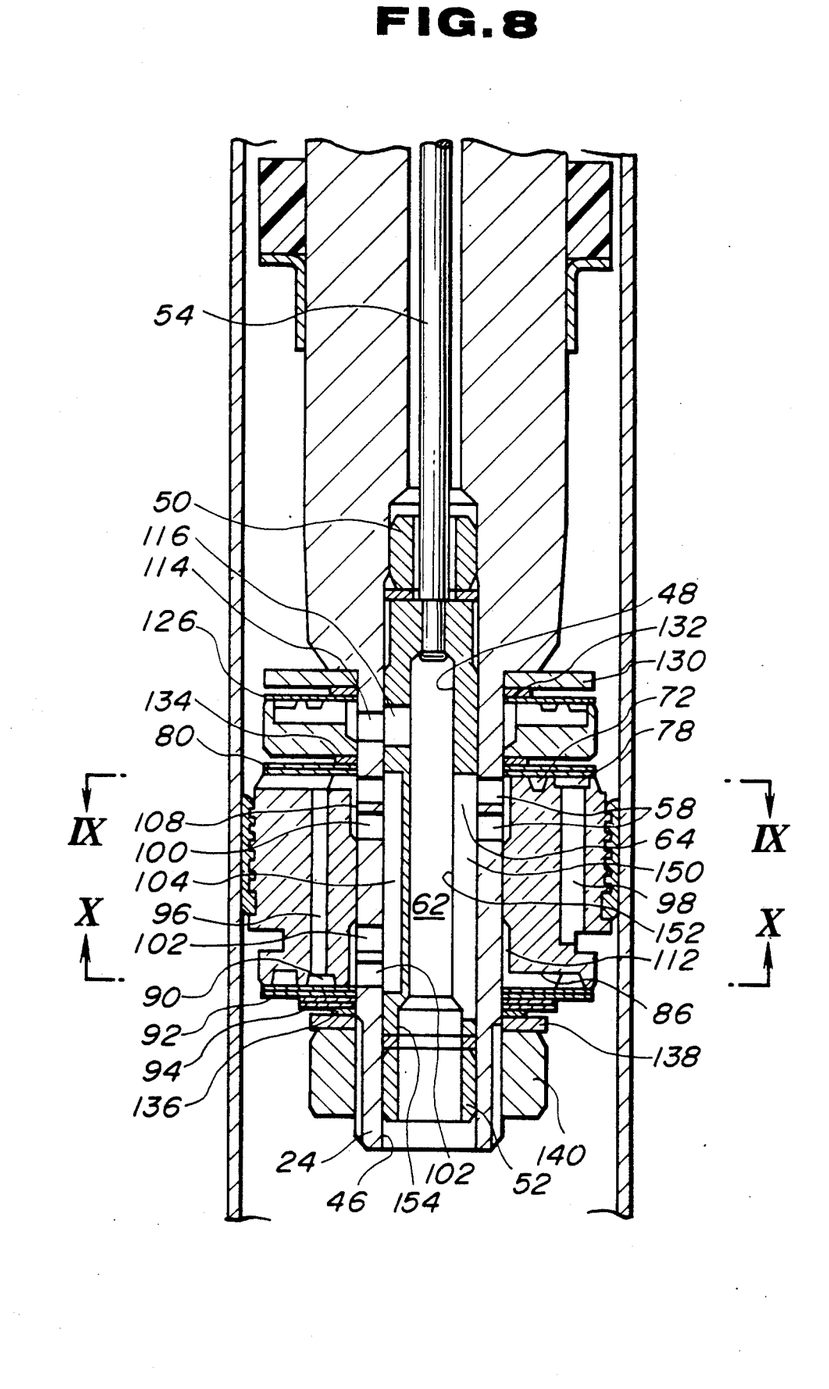
FIG. 8 is a similar view to FIG. 1 showing a second embodiment of a hydraulic damper.
Figure 9:
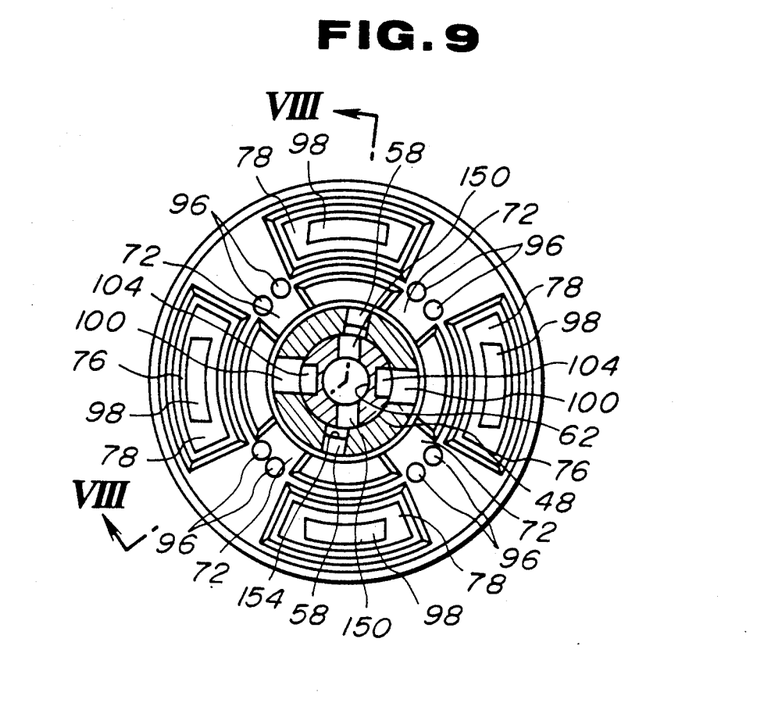
FIG. 9 is a similar view to FIG. 2 showing a section taken through the line IX—IX in FIG. 8.
Figure 10:
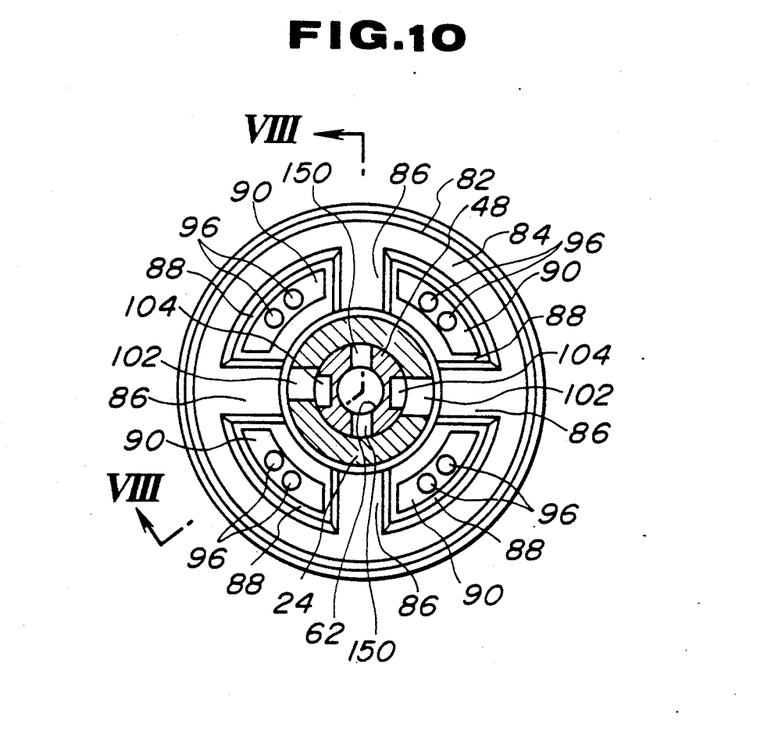
FIG. 10 is a similar view to FIG. 3 showing a section taken through the line X—X in FIG. 8.

In the second embodiment shown in FIG. 8, the first embodiment is modified such that the effective flow sectional area of the axial passage 62 of the valve element 48 is increased without any increase in radial dimension of the valve element 48. Specifically, a valve element 48 is formed with one or more slots 150 communicating with an axial passage 62, thus forming part of the axial passage 62. The slots 150 include openings 64 mating with valve ports 58, respectively. Thus, since the slots 150 communicate with an inner wall of a valve sleeve 46, the valve sleeve 46 faces the axial passage 62 through the slots 150. The axial passage 62 includes a first bore 152 and a second increased diameter bore 154. The second increased diameter bore 154 has one or upper end connected to the first bore 152 and an opposite or lower end opening to a second chamber 18. The slots 150 open not only to the first bore 152 but also to the second increased diameter bore 154 for providing increased effective flow cross sectional area.

What is claimed is:

1. A hydraulic damper comprising:
means for defining a bore containing a hydraulic fluid;
means for dividing said bore into a first chamber and a second chamber,
said dividing means including a piston having a through bore and wall means defining said through bore, a piston rod including a reduced diameter valve sleeve fixedly received in said through bore, a valve element disposed in said valve sleeve for relative movement to said valve sleeve between a plurality of positions,
said valve sleeve having at least one first port communicating with said first chamber,
said valve element having a passage having one end closed and an opposite end communicating with said second chamber and wall means defining said passage, said valve element having an opening communicating with said passage, said valve element covering said first port and being movable to uncover said first port to allow fluid communication between said first port and said opening,
said piston having a valve passage having one end communicating with said first chamber and an opposite end;
means for preventing fluid flow into said opposite end of said valve passage and restricting fluid flow from said opposite end of said valve passage into said second chamber;
said valve sleeve having at least one second port communicating with said first chamber and at least one third port,
said valve element having a transfer groove,
said valve element covering said second port and being moveable to uncover said second port to establish fluid communication between said second port and said transfer groove that in turn communicates with said third port; and means for preventing fluid flow into said third port from said second chamber and restricting fluid flow out of said third port into said second chamber.

2. A hydraulic damper as claimed in claim 1, wherein said plurality of positions includes a first or hard position, a second or soft position, and a third or medium position.

3. A hydraulic damper as claimed in claim 2, wherein said valve element covers said first port and said second port in said first or hard position.

4. A hydraulic damper as claimed in claim 3, wherein said valve element uncovers both said first port and said second port in said second or soft position.

5. A hydraulic damper as claimed in claim 4, wherein said valve element covers said first port and uncovers said second port in said third or medium position.

6. A hydraulic damper as claimed in claim 1, wherein said valve element is rotatably disposed in said valve sleeve, and said element starts uncovering said second port when said valve element is rotated in one direction beyond a predetermined angular position and also starts uncovering said first port when said valve element is further rotated in said one direction beyond a second predetermined angular position.

7. A hydraulic damper as claimed in claim 1, wherein said valve element is formed with a slot communicating with said passage, said slot including said opening and forming a part of said passage to add an effective flow cross sectional to that of said passage.

8. A hydraulic damper as claimed in claim 7, wherein said slot communicates said valve sleeve so that said valve sleeve faces said passage through said slot.

9. A hydraulic damper as claimed in claim 8, wherein said valve element is formed with a first bore and a second increased diameter bore having one end connected to said first bore and an opposite end opening to said second chamber, and said slot opening not only to said first bore but also to said second increased diameter bore.

10. A hydraulic damper as claimed in claim 9, wherein said valve element has said transfer groove and said first reduced diameter bore formed at the same portion.

11. A hydraulic damper as claimed in claim 1, wherein said wall means defining said through bore of said piston includes a first portion surrounding said valve sleeve in spaced relationship therefrom and cooperates with said valve sleeve to define therebetween an annular space communicating with said first port and said second port.

12. A hydraulic damper as claimed in claim 11, wherein said wall means defining said through bore of said piston includes a second portion surrounding said valve sleeve in spaced relationship therefrom and cooperates with said valve sleeve to define therebetween an annular space communicating with said third port.

* * * * *